United States Patent Office 3,309,324
Patented Mar. 14, 1967

3,309,324
CORROSION INHIBITED AMMONIUM SULFATE SOLUTIONS AND COMPOSITIONS USEFUL FOR MANUFACTURING THEM
Robert P. Langguth, St. Louis, and William W. Morgenthaler, Bridgeton, Mo., assignors to Monsanto Company, a corporation of Delaware
No Drawing. Filed Dec. 23, 1963, Ser. No. 332,845
23 Claims. (Cl. 252—387)

This invention relates to improved aqueous solutions of ammonium sulfate, which solutions are characterized by a significantly reduced tendency to corrode copper metal and copper-containing alloys.

The use of aqueous diammonium sulfate solutions, sometimes thickened with viscosity-modifying agents, as fire-fighting solutions, is known; but practical applications in this area have been somewhat restricted by the corrosive action of the diammonium sulfate solutions when in contact with copper or copper-alloy equipment such as tanks, fittings and nozzles. This corrosive action is especially undesirable when aircraft are used in the application of the diammonium sulfate solutions.

An object of this invention is a reduction in the corrosive action of aqueous diammonium sulfate solutions on copper metal and copper-containing alloys.

This object and other objects are obtained by adding to the aqueous ammonium sulfate solutions an effective amount of a compound (which is at least partially soluble in such solutions) selected from the group consisting of iodides, thiocyanates, ferricyanides, ferrocyanides, thiosulfates and 8-hydroxyquinoline. Of the inorganic salts in this group, those having alkali metal cations are generally preferred. The term "alkali metal" as used herein includes not only sodium and potassium, but also the ammonium group. The form in which the iodide, thiocyanate, ferricyanide, ferrocyanide and thiosulfate ions are introduced into said solution is not critical; thus any soluble iodide, thiocyanate, ferricyanide, ferrocyanide and thiosulfate as, for example, the Na, K or quaternary ammonium salts may be used, as can also be used any salt which, upon being stirred into an aqueous ammonium sulfate solution, releases any of the aforementioned copper-corrosion inhibiting anions of the present invention into the solution. This includes such typical, non-limiting, examples as the sodium, potassium, lithium, ammonium, magnesium and calcium iodides, thiocyanates, ferricyanides, ferrocyanides and thiosulfates, nickel iodide, ferrous iodide, ferrous thiosulfate, cobaltous iodide, chromous iodide and the like.

The aqueous diammonium sulfate solutions of this invention may be of any concentration, limited only by solubility and suitability to the specific purposes for which said aqueous diammonium sulfate solutions are intended. The preferred concentration of diammonium sulfate for use in fighting forest fires is between about 5 and about 30% by weight. In the practice of the present invention, one or more of the corrosion inhibitors of the present invention is present in the diammonium sulfate solutions in an effective amount; generally in an amount from about 0.005 to about 5 and optimally from about 0.01 to about 2% by weight, the weight ratio between diammonium sulfate and corrosion inhibitor in the inhibited solutions generally being from about 6000:1 to about 30:1, and preferably from about 1000:1 to about 40:1; although still larger or smaller amounts can be utilized advantageously.

It is common practice to add a sticking agent such as carboxymethylcellulose (hereinafter referred to simply as CMC) to diammonium sulfate fire-fighting solutions so that, when the solution is applied to combustible material in the path of a fire, the said fire-fighting solution sticks to the combustible material and does not run off so rapidly as to be ineffective. A thickener may also be incorporated if desired into the corrosion-inhibited diammonium sulfate solution of the present invention without departing from the spirit of this invention, but such addition is not required by the invention.

The preparation of the corrosion-inhibited aqueous ammonium sulfate solution presents no special problem because all of the solid components are readily water-soluble or water-dispersible; and a simple stirring of a suitable quantity of the soluble particulate solids into water at ambient temperature is an adequate process for the preparation of a homogeneous solution. The solutions of the invention are stable and may be stored as such, although in practice it is preferable to conserve storage and shipping space by preparing a granular or liquid concentrate (containing all of the essential ingredients, except little or no water) to be dissolved or diluted at a time closer to that at which the solution is to be used.

The corrosion-inhibited aqueous solution of ammonium sulfate may be used for purposes other than for fire-fighting, e.g., as a fertilizer; and this invention encompasses the compositions described without regard to the final use of the solution.

The following example serves to illustrate the invention.

*Example 1*

Fifty grams of diammonium sulfate are dissolved with stirring in 250 ml. water at approximately 25° C. and 1.2 g. of potassium iodide are added with further stirring. One gram of CMC is added and mixed thoroughly, in such a manner that no significant aeration is produced, because it is undesirable to induce a frothing effect. Neither the temperature nor the sequence of mixing is critical. The fire-fighting effectiveness of the mixture is not adversely affected by the addition of the KI. A strip of copper alloy immersed in the inhibited solution for 3 days showed 2.0 m.p.y. corrosion calculated from the weight lost by the copper strip during the immersion. By comparison, a control strip immersed in an aqueous solution containing only thickened diammonium sulfate was fairly extensively (75 m.p.y.) corroded.

Data in the following Table I were acquired in the manner detailed in Example 1, above.

TABLE I

| Inhibitor tested | Concentration of ammonium sulfate | Concentration of inhibitor, percent | Corrosion (m.p.y.) |
|---|---|---|---|
| Control | 15 | 0.0 | 75.0 |
| KI | 15 | 0.5 | 2.0 |
| NaSCN | 15 | 0.1 | 0.2 |
| $K_3Fe(CN)_6$ | 15 | 0.1 | 0.2 |
| $K_4Fe(CN)_6$ | 15 | 0.1 | 0.7 |
| $Na_2S_2O_3$ | 15 | 0.5 | 30.0 |
| 8-hydroxyquinoline | 15 | 0.1 | 4.3 |

A total of 1,000 gallons of each of the compositions described in Table I are dropped from a conventional air tanker aircraft out-fitted for this purpose over a rectangular area approximately 150 feet wide and about 325 feet long on dense brush (consisting of a mixed stand of oak, mountain mahogany and dry annual grass) across the path of a very hot freely burning fire. The fire is not able to burn completely through the treated area.

Data for the following Table II illustrates the copper-corrosion inhibiting ability of the compounds of the present invention in aqueous solutions containing no sticking agent and 22 weight percent of diammonium sulfate dissolved therein. Corrosion tests for the data in Table II are conducted using 1 inch by 2 inch by $\frac{1}{32}$ inch polished copper strips. Each strip is alternately immersed and drained for 30 second periods in the diammonium sulfate solution for a total of 72 hours while the temperature of the solution is maintained at about 25° C. Corrosion in m.p.y. is then calculated from the weight lost by the strip during the test.

TABLE II

| Inhibitor Tested | Concentration of Inhibitor | Corrosion (m.p.y.) |
|---|---|---|
| Control | | 135 |
| KI | 0.5 | 2.0 |
| KI | 0.25 | 25.5 |
| KI | 0.1 | 80 |
| NaSCN | 0.2 | 0.1 |
| NaSCN | 0.1 | 0.1 |
| $K_3Fe(CN)_6$ | 0.2 | 0 |
| $K_3Fe(CN)_6$ | 0.1 | 0.2 |
| $K_4Fe(CN)_6$ | 0.2 | 0.2 |
| $K_4Fe(CN)_6$ | 0.1 | 0.5 |
| $Na_2S_2O_3$ | 0.5 | 40.0 |
| $Na_2S_2O_3$ | 0.25 | 70.0 |
| $Na_2S_2O_3$ | 0.1 | 95.0 |

What is claimed is:

1. An aqueous diammonium sulfate composition, in contact with a material selected from the group consisting of copper and copper alloys, which contains dissolved therein, in addition to said diammonium sulfate, a water soluble copper corrosion inhibiting material selected from the group consisting of alkali metal-, ammonium-, magnesium- and calcium-iodides, thiocyanates, ferricyanides, ferrocyanides, and thiosulfates, and 8-hydroxyquinoline, the weight ratio between said diammonium sulfate and said corrosion inhibiting material being from about 6000:1 to about 30:1.

2. A method of retarding the corrosion of copper and copper alloys upon contact with a normally corrosive aqueous diammonium sulfate solution consisting essentially of water and, dissolved therein, from about 5 to about 30 weight percent of diammonium sulfate, which method comprises effecting said contact when said aqueous diammonium sulfate solution contains dissolved therein from about 0.005 to about 5 weight percent of a water soluble copper corrosion inhibiting material selected from the group consisting of alkali metal-, ammonium-, magnesium-, and calcium-iodides, thiocyanates, ferricyanides, ferrocyanides, and thiosulfates, and 8-hydroxyquinoline.

3. A process according to claim 2, wherein said corrosion inhibiting material is an alkali metal iodide.

4. A process according to claim 2, wherein said corrosion inhibiting material is an alkali metal thiocyanate.

5. A process according to claim 2, wherein said corrosion inhibiting material is an alkali metal ferricyanide.

6. A process according to claim 2, wherein said corrosion inhibiting material is an alkali metal ferrocyanide.

7. A process according to claim 2, wherein said corrosion inhibiting material is an alkali metal thiosulfate.

8. A process according to claim 2, wherein said corrosion inhibiting material is 8-hydroxyquinoline.

9. A corrosion-inhibited composition as in claim 1, wherein the water-soluble corrosion inhibiting material is present in an amount between about 0.01 and about 2 weight percent of said composition.

10. A corrosion-inhibited composition as in claim 1, wherein the concentration of said diammonium sulfate is from about 5 to about 30 weight percent of said composition.

11. A corrosion-inhibited composition as in claim 10, wherein said corrosion inhibiting material is an alkali metal iodide.

12. A corrosion-inhibited composition as in claim 11, wherein said alkali metal iodide is sodium iodide.

13. A corrosion-inhibited composition as in claim 11, wherein said alkali metal iodide is potsasium iodide.

14. A corrosion-inhibited composition as in claim 10, wherein said corrosion inhibiting material is an alkali metal thiocyanate.

15. A corrosion-inhibited composition as in claim 14, wheren said alkali metal thiocyanate is sodium thiocyanate.

16. A corrosion-inhibited composition as in claim 10, wherein said corrosion inhibiting material is an alkali metal ferricyanide.

17. A corrosion-inhibited composition as in claim 16, wherein said alkali metal ferricyanide is sodium ferricyanide.

18. A corrosion-inhibited composition as in claim 10, wherein said corrosion inhibiting material is an alkali metal ferrocyanide.

19. A corrosion-inhibited composition as in claim 18, wherein said alkali metal ferrocyanide is sodium ferrocyanide.

20. A corrosion-inhibited composition as in claim 10, whererin said corrosion inhibiting material is an alkali metal thiosulfate.

21. A corrosion-inhibited composition as in claim 20, wherein said alkali metal thiosulfate is sodium thiosulfate.

22. A corrosion-inhibited composition as in claim 20 wherein said alkali metal thiosulfate is potassium thiosulfate.

23. A corrosion-inhibiting composition as in claim 10, wherein said corrosion inhibiting material is 8-hydroxyquinoline.

References Cited by the Examiner

UNITED STATES PATENTS

| | | | |
|---|---|---|---|
| Re. 23,740 | 11/1953 | Ryznar et al. | 252—389 |
| 2,215,092 | 9/1940 | Beekhius et al. | 252—389 |
| 2,783,132 | 2/1957 | Panepinto | 252—389 |
| 2,957,762 | 10/1960 | Young | 252—387 |
| 2,980,620 | 4/1961 | Hatch | 252—387 X |
| 3,017,348 | 1/1962 | Steppe et al. | 252—2 |
| 3,104,969 | 9/1963 | Miller | 252—389 |
| 3,161,598 | 12/1964 | Geld | 252—387 |

FOREIGN PATENTS

| | | |
|---|---|---|
| 492,659 | 5/1953 | Canada. |
| 575,798 | 5/1959 | Canada. |

OTHER REFERENCES

Chemical Week, Oct. 7, 1961, pp. 39, vol. 89, No. 14.

LEON D. ROSDOL, *Primary Examiner.*

JULIUS GREENWALD, SAMUEL H. BLECH,
*Examiners.*

M. WEINBLATT, *Assistant Examiner.*